United States Patent [19]
Wagner et al.

[11] Patent Number: 5,335,544
[45] Date of Patent: Aug. 9, 1994

[54] APPARATUS FOR MEASURING MECHANICAL FORCES AND FORCE ACTIONS

[75] Inventors: Bernhard Wagner; Wolfgang Benecke; Werner Riethmüller; Uwe Schnakenberg, all of Berlin, Fed. Rep. of Germany

[73] Assignee: Fraunhofer Gesellschaft zur Forderung der angewandten Forschung e.V., Fed. Rep. of Germany

[21] Appl. No.: 778,893

[22] PCT Filed: May 31, 1990

[86] PCT No.: PCT/DE90/00412
§ 371 Date: Feb. 21, 1992
§ 102(e) Date: Feb. 21, 1992

[87] PCT Pub. No.: WO91/00522
PCT Pub. Date: Jan. 10, 1991

[30] Foreign Application Priority Data

Jun. 23, 1989 [DE] Fed. Rep. of Germany ....... 3920645

[51] Int. Cl.$^5$ ............................................. G01P 15/08
[52] U.S. Cl. ..................... 73/517 R; 73/862.382; 73/514
[58] Field of Search .............. 73/862.382, 514, 517 R, 73/517 B; 361/280; 338/5, 46; 437/228

[56] References Cited

U.S. PATENT DOCUMENTS 4,882,933 11/1989 Petersen et al. ................... 73/517 R
5,111,693 5/1992 Greiff ..................................... 73/514

Primary Examiner—John E. Chapman
Attorney, Agent, or Firm—Evenson, McKeown, Edwards & Lenahan

[57] ABSTRACT

An apparatus for measuring mechanical forces and force actions by means of a body, a restoring element and a movable mass, with elements for limiting the deflections of the movable mass. The movable mass is deflected against the resistance of the restoring element under the influence of a mechanical force which, with the aid of sensors, is converted into electrical signals. The elements for limiting deflection include at least two parallel tongues fixed respectively to the restoring element and to the movable mass, and a bridge element fixed at right angles to one of the tongues, at least partly overlapping the other of the tongues.

8 Claims, 3 Drawing Sheets

APPARATUS FOR MEASURING MECHANICAL FORCES AND FORCE ACTIONS

BACKGROUND AND SUMMARY OF THE INVENTION

The present invention relates to an apparatus for measuring mechanical forces and force actions by means of a body, a restoring element and a movable mass, with elements for limiting the deflections of the movable mass. The movable mass is deflected against the resistance of the restoring element under the influence of a mechanical force. The mechanical elements of such an apparatus are manufactured by standard microstructural technology, isotropic and anisotropic etching processes, whilst the electronic elements for determining the measured values are manufactured with microelectronics production processes. With the aid of sensors the mechanical actions of a force are converted into electrical signals and supplied to an evaluation circuit.

Such devices are used, for example, for measuring accelerations, are described by J. L. Davison and D. V. Kerns in "Silicon Acceleration Technology", Proceedings of the 1'~86 International Conference on Industrial Electronics, Control and Instrumentation, IEEE, New York, 1986, pp. 218-222.

Apart from use-specific characteristics, when manufacturing devices for the measurement of forces and force actions account must also be taken of the requirements devolving from the general field of use of the apparatus. These requirements include insensitivity to mechanical overstressing. For example, a microgravimeter for satellites or space stations must be able to withstand accelerations which are orders of magnitude above its measuring range.

In all known solutions, overload protection is achieved by mechanical stops, which limit the deflection of the movable mass of an apparatus for measuring acceleration to certain maximum values. In monolithically integrated devices produced from a single semiconductor chip, such elements for limiting the deflection of the movable mass are e.g. produced by the application of additional coatings. For this purpose at least one second semiconductor or glass plate must be connected to the monolithically integrated apparatus by adhesion or joining. This means that for the production of the stops, it is necessary to carry out additional operating steps not provided in the monolithic integration process. Moreover, joined devices suffer from additional sources of fault and error.

German patent document DE-OS 36 11 360 and U.S. Pat. No. 4,699,006 describe devices in which rotary pendulums are etched out of semiconductor crystals. A mechanical stop is formed in that the substrate is not completely removed below the rotary pendulum and instead pits are etched out, with the pit bottom being used as a mechanical stop during deflection of the rotary pendulum.

However, this type of mechanical limitation is not suitable for uses in which the deflection or amplitude must be limited to very small values, because a minimum etch pit depth is required for the complete undercutting of the rotary pendulum.

U.S. Pat. No. 4,653,326 discloses a micromechanical apparatus for measuring accelerations, which has a bender bar, which can perform deformations in the substrate plane. The bender bar is produced by clearance etching from the substrate. In order to obtain a deflection parallel to the substrate surface the substrate must be completely removed. The remaining limiting legs of the substrate form mechanical boundaries for the deflection of the bender bar in the substrate plane. Particularly if the leg faces of U.S. Pat. No. 4,653,326 are to be constructed as capacitor plates, they are not immediately suitable for limiting to very small deflections.

The object of the invention is therefore to provide a device for measuring mechanical forces and force actions with a mechanical overload protection, which can be made particularly easily adapted to the requisite use conditions and which is characterized by a very simple manufacturing process.

This object is achieved by the force measurement apparatus according to the invention, in which the element for limiting the deflection comprises at least two parallel tongues and a web, or bridge element, at right angles to said tongues. The fixed end of the first tongue is connected to the restoring element or the movable mass, and the fixed end of the second tongue is connected to the fixed body. The web is connected to one tongue and partly covers the other tongue. For limiting the deflection of the movable mass at least one element is provided in each of the two movement directions. The restoring element can only be deflected to a point at which the second tongue strikes against the web of the first tongue and therefore limits the deflection. The magnitude of the allowed deflection is determined by the clearance between the web and the tongue surface, and the distance between the element and the restoring element suspension point. At least one limiting element is provided for each deflection direction.

A first embodiment of the invention, used for measuring acceleration, has a very simple production procedure using microstructural technology processes. The deflection is limited by interengaging tongue systems, and in each case one part of the tongues is fitted to the fixed body and a second part of the tongues to the movable restoring element constructed as a bender bar. In each case adjacent tongues of the first type are connected by self-supporting or cantilever bridge elements, which are at a predetermined distance from the surface. The bridges need not necessarily be of a through nature, and it is sufficient if they partly overlap the adjacent tongues of the other type. The distance between the bridges and the original substrate surface, and the distance between the systems of tongues from the suspension point of the restoring element, determine the maximum movement stroke of the movable mass. Through the construction of movement-limiting bridges on the tongues of one system fitted to the fixed body and on the tongues of the other system fitted to the restoring element, a bidirectional movement limitation can be obtained.

In a further embodiment, the measurement of the force leading to the deformation of the restoring element is performed by means of an integrated resistance strain gauge. As a result the electrical contacts of the apparatus are located in the process plane and can therefore be connected by simple conductors to an evaluating circuit. In still another embodiment, the force is capacitively measured by changing the spacing of facing plates. One plate is connected to the body and the second plate to a movable part of the apparatus.

These two embodiments of the invention represent possibilities which can be particularly simply put into effect with the aid of microelectronics. It is obviously also possible to use other methods and physical effects (e.g. the piezoelectric effect, ferroelectric effect, magnetic methods) for force determination purposes. The measurement device according to the invention can be made from materials conventionally used in micromechanics and microelectronics. Moreover, in a preferred embodiment, the elements for limiting the deflection of the inert mass or the bender bar are integrated in monolithic manner into the same process plane together with the other elements of the apparatus, in a process plane defined by the micromechanical processes. The cantilever bridge structures can also be produced by the application (preferably by vapour deposition) and subsequent electroplating reinforcement of a metal coating, preferably gold. However, the cantilever bridge structures can also be made from silicon or a silicon compound.

The advantages attained as a result of the invention are in particular that the apparatus has an overload protection for high forces, and that the overload protection is monolithically integrated into a body together with other elements of the apparatus. This renders superfluous additional measures for fitting an element for limiting the deflection. It is in particular possible to avoid joining a second and third semiconductor or glass coating. The inventive apparatus is therefore characterized by a particularly simple manufacturing process and high durability and stability.

As all the elements, including the electrical contacts are integrated into one surface, the apparatus is particularly suitable for the joint integration of micromechanical elements and the evaluation circuit on a single chip. Through varying the spacing from the cantilever bridges to the surface and the distance from the deflection limiting elements to the suspension point of the restoring element, a different overload protection for different purposes can be obtained.

The invention is suitable for use in air and land traffic, in space travel and for component positioning in robotics. With a further development of the invention it is also possible to determine pressures and pressure differences (e.g. altimetry) or flow rates of liquids.

Other objects, advantages and novel features of the present invention will become apparent from the following detailed description of the invention when considered in conjunction with the accompanying drawings.

BRIEF DESCRIPTION OF THE DRAWINGS

FIG. 1.a shows an embodiment of the invention in which a strain gage is used to measure bending of the resilient restoring element;

FIG. 1.b shows an embodiment of the invention in which deflection of the moveable mass is measured by means of capacitor plates;

DETAILED DESCRIPTION OF THE DRAWING

Figure 1A:
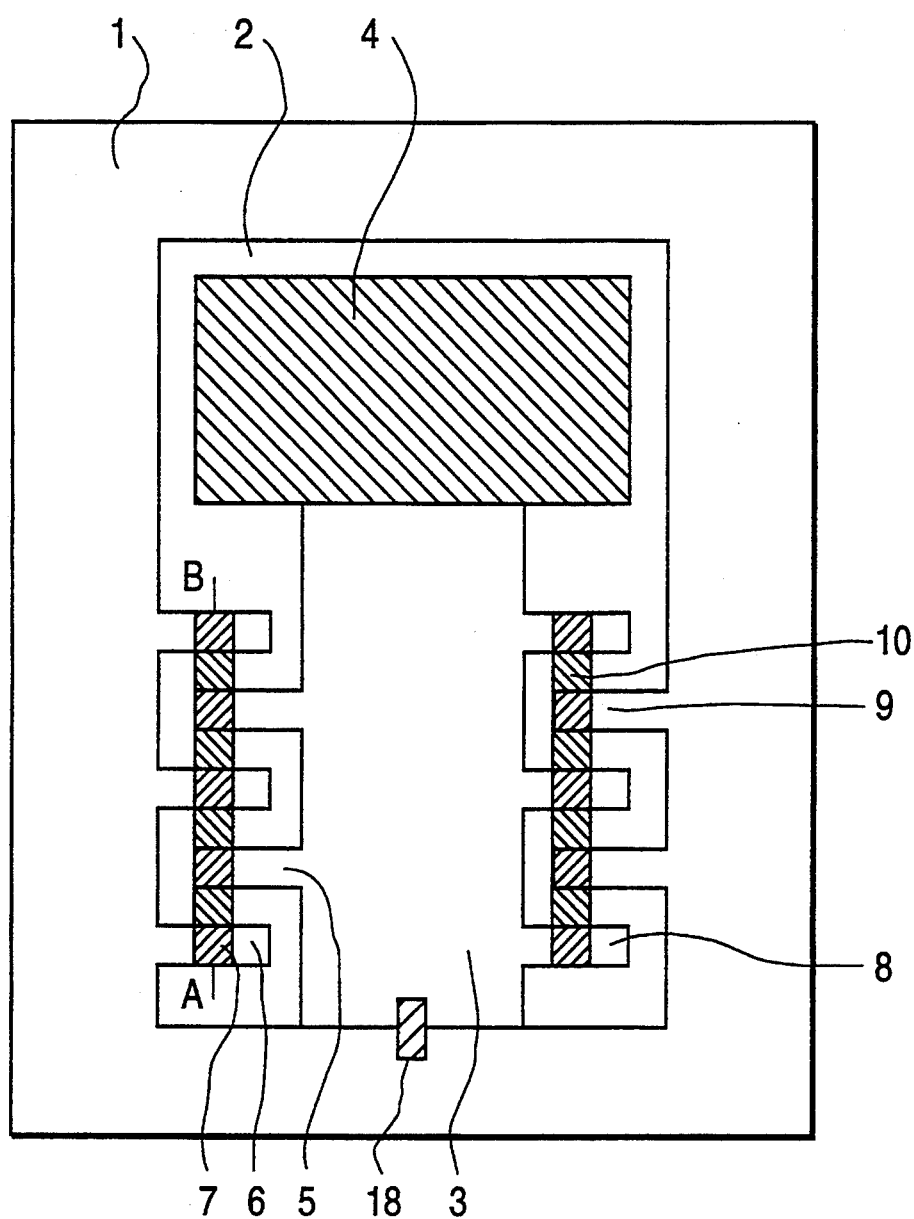
FIG. 1 shows a plan view of a measurement device according to the invention.

The apparatus of FIG. 1 is used for measuring accelerations and comprises a parallelepipedic body 1, which is produced from a silicon wafer with a thickness of approximately 500 microns. Typical dimensions for the body are 500×300 microns. The body has a depression with a rectangular cross-section on the surface. On one narrow side the body has a bender bar 3 (with a thickness between 1 and 100 microns), which carries a mass 4 at its loose end. Two tongues 5 project vertically from one longitudinal side of the bender bar 3 and with which are associated three tongues 6 fixed to the body 1 in such a way that they form a row of parallel, interengaging tongues. The three tongues 6 fixed to the body are interconnected by means of a self-supporting or cantilever bridge 7, which spans the two other tongues in a manner discussed below. On the other longitudinal side of the bender bar are fitted three tongues 8, which with two tongues 9 connected to the body also form a row of interengaging tongues. The three tongues 8 connected to the bender bar are connected in an identical manner to one another by means of a self-supporting bridge 10. The thickness of the tongues corresponds to that of the bender bar, and the bridges are a few dozen microns thick.

Figure 1B:
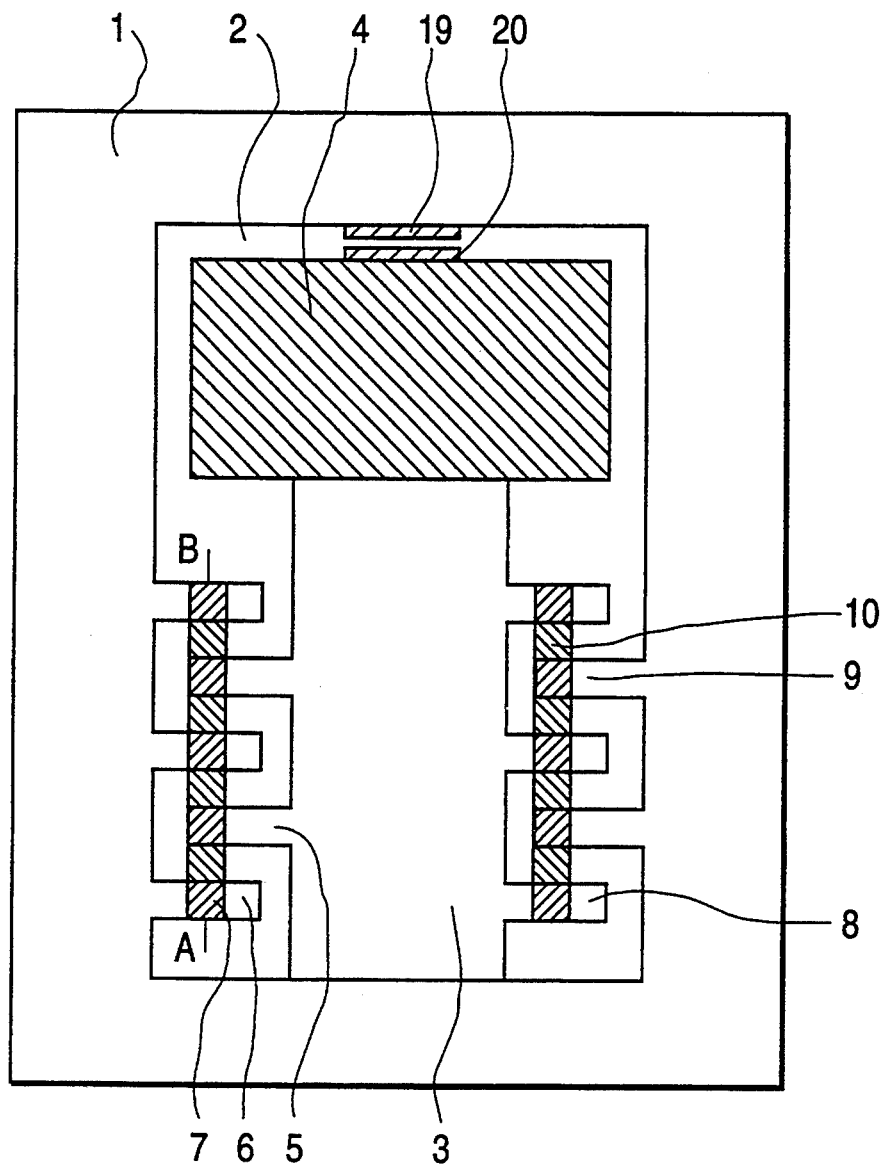

In the case of an upward deflection, the bridge 7 constitutes a stop for the two tongues 5 of the bender bar, whilst in the case of a downward deflection the bridge 10 for the two tongues 9 fixed to the body fulfills this function. Acceleration can be determined by means of an integrated resistance strain gauge 18 as shown in FIG. 1a or by means of capacitor plates 19 and 20 as shown in FIG. 1b.

Figure 2:
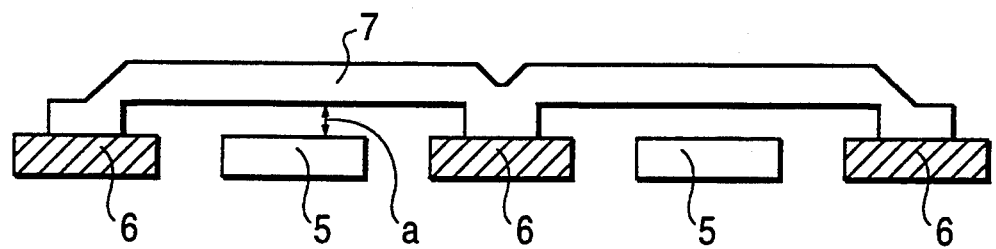
FIG. 2 is an enlarged cross-section along line A-B of FIG. 1.
Figure 3A:
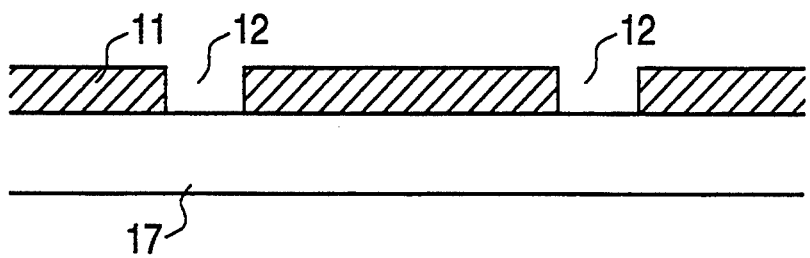
FIG. 3(a-e) illustrates a method for producing a bridge structure according to the invention.
Figure 3B:
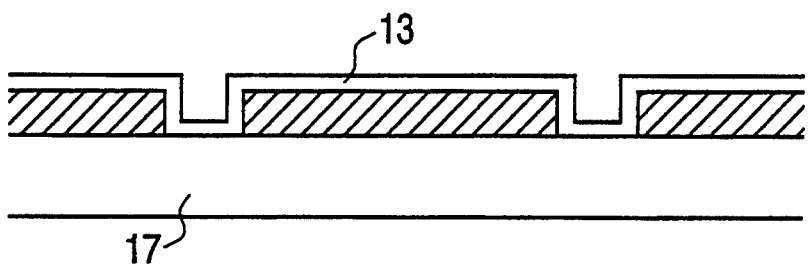
Figure 3C:
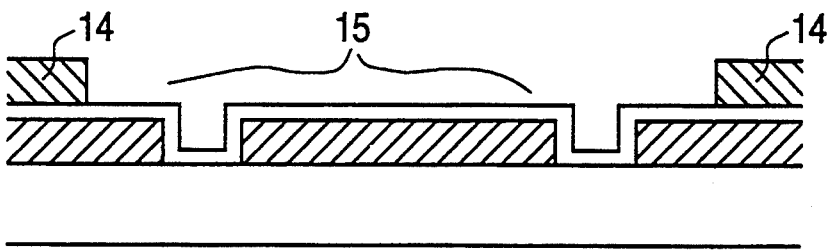
Figure 3D:
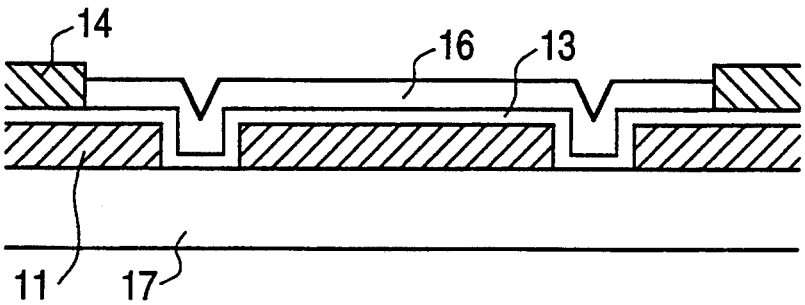
Figure 3E:
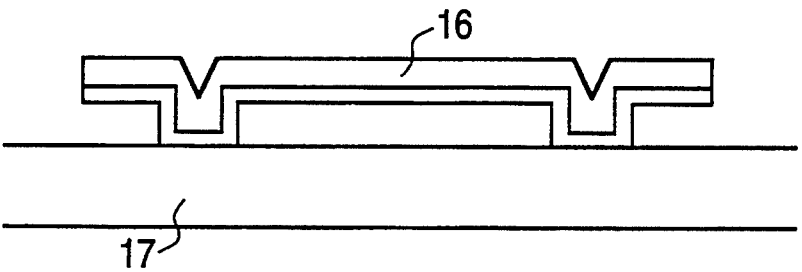

FIG. 2 shows an enlarged cross-section through a system of tongues along the section line A B in FIG. 1. The bridge 7, which is carried by the tongues 6 fixed to the body, spans the tongues 5 connected to the bender bar 3 with a clearance a. The predeterminable clearance a determines the maximum amplitude of the deflection of the tongues 5 relative to the tongues 6 in the direction of the bridge.

An identical picture is obtained for the second tongue system. However, in this case the bridge 10 is supported on three tongues 8, which are connected to the bender bar 3. Therefore the bridge 10 follows the movement of the bender bar. In the case of a downward deflection of the bender bar 3, the tongues 9 form a stop for the bridge 10.

The process steps for the manufacture of the cantilever bridges 7 and 10 are shown in FIG. 3. Firstly the mechanical elements of the accelerometer are defined, e.g. by local high boron doping. The tongue structures are produced simultaneously with the bender bar. Additional process steps are only required for the cantilever bridge structure.

a) A first photoresist coating 11 is applied to the surface of the substrate 17 for the formation of the bridges. The thickness of this coating, which can be between 1 and 100 microns, determines the subsequent clearance a between the cantilever bridge and the tongue surface. In the areas 12 of the tongues, which carry the bridge, the photoresist coating 11 is partly removed.

b) A starting electroplated coating 13 is applied to the photoresist coating 11 and the exposed areas 12. Preferably vapour deposition takes place of an approximately 100 mm thick gold coating.

c) The surface is coated with a second photoresist coating 14, which is removed in the area 15 of the bridges to be formed.

d) The starting electroplated coating 13 is reinforced by electroplating until the desired thickness of the bridge structure 16 of a few dozen micrometers is obtained.

A cantilever bridge structure is formed by removing the first photoresist coating 11, the starting coating 13 and the second photoresist coating 14. The coating thickness are not shown true to scale in the drawings for reasons of clarity. Other materials, e.g. based on polycrystalline.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Apparatus for measuring mechanical forces and force actions, comprising:
    a fixed body;
    a movable mass which is displaceable relative to said fixed body in at least two directions;
    a resilient restoring element coupling said fixed body to said movable mass; and
    first and second means for limiting displacement of said movable mass in each of said two directions, each of said first and second means comprising:
    at least a pair of first rigid tongues connected at an end thereof to one of said restoring element and said movable mass, and at least a pair of second rigid tongues connected at an end thereof to said fixed body;
    said first and second rigid tongues being parallel to and overlapping each other;
    and a bridge element arranged at right angles to said tongues, said bridge element being connected to one of said pairs of rigid tongues, and extending over the other of said pairs of rigid tongues, in a direction of displacement of said movable mass.

2. Apparatus according to claim 1, wherein said restoring element is constructed as a bender bar fixed on one end to the body and having a free end which carries the movable mass; two rows of tongues connected to the bender bar are interleaved with tongues connected to the fixed body in comb-like manner; and the tongues connected to the fixed body and the tongues connected to the bender bar respectively are connected by cantilever bridge elements, which span the intermediate tongues with a predeterminable clearance.

3. Apparatus according to claim 1, wherein deformation of the restoring element caused by a force action is determined by means of integrated resistance strain gauges.

4. Apparatus according to claim 2, wherein deformation of the restoring element caused by a force action is determined by means of integrated resistance strain gauges.

5. Apparatus according to claim 1, wherein facing plates are fitted to parts fixed to the body and movable parts of the apparatus and form a capacitor with a variable plate spacing, the acting force being measured by the determination of the capacitance change.

6. Apparatus according to claim 2, wherein facing plates are fitted to parts fixed to the body and movable parts of the apparatus and form a capacitor with a variable plate spacing, the acting force being measured by the determination of the capacitance change.

7. Apparatus according to claim 1, wherein the fixed body, the restoring element and the tongues are made from silicon or a silicon compound, and the bridges for connecting the tongues are made from a metal, silicon or a silicon compound.

8. Apparatus for measuring mechanical forces and force actions, comprising:
    a fixed body;
    a movable mass which is displaceable relative to said fixed body in at least two directions;
    a resilient restoring element coupling said fixed body to said movable mass; and
    first and second means for limiting displacement of said movable mass in each of said two directions, each of said first and second means comprising:
    at least one first rigid tongue connected at an end thereof to said restoring element or said movable mass, and at least one second rigid tongue connected at an end thereof to said fixed body;
    said first and second rigid tongues being parallel to and overlapping each other;
    and a bridge element arranged at right angles to said tongues, said bridge element being connected to one of said rigid tongues, and extending over the other of said rigid tongues, in a direction of displacement of said movable mass.

* * * * *